Sept. 20, 1966  F. O. SKIDMORE  3,273,941
RESILIENTLY MOUNTED WHEEL BALANCING WEIGHTS
Filed Oct. 28, 1964

INVENTOR.
FRANK O. SKIDMORE
BY Oldham & Oldham
ATTYS.

United States Patent Office 3,273,941
Patented Sept. 20, 1966

3,273,941
RESILIENTLY MOUNTED WHEEL BALANCING WEIGHTS
Frank O. Skidmore, Cuyahoga Falls, Ohio, assignor to Donald Gottwald, Akron, Ohio
Filed Oct. 28, 1964, Ser. No. 406,984
7 Claims. (Cl. 301—5)

This invention relates to a resiliently mounted wheel balancing weight, and more particularly to the combination which includes a rim, tire, and balancing weights adhered to the rim to effect static and dynamic balance of the combination where the weights are resiliently mounted and secured to the rim by adhesive. This application is a continuation-in-part of my application Serial No. 329,616 filed December 6, 1963 for "Wheel Balancing Weights and Method of Balancing Therewith" which application is a continuation-in-part of my original application Serial No. 206,264 filed June 29, 1962, now abandoned.

In the manufacture of pneumatic tires, it is extremely difficult to produce a perfectly balanced tire, although present practices approach this end. Also, wheels and drop center rims manufactured within limit tolerances may be slightly out of balance so that both before and after the pneumatic tire is mounted upon the rim, the assembly is out of balance. The above-identified patent application Serial No. 329,616 describes an improved balancing weight which is spread over a substantial arcuate area to effect the proper static and dynamic counterbalance with the weight being held in position on a radially inner surface of the rim by suitable adhesive means. Even though this balancing weight and method of balancing has proved to be highly successful and to provide an improvement in the balancing art, it has been found that excessive vibrations on a wheel combination during extended use plus the difficulty in pressing or forcing the adhesive into irregularities in the rim to assure a complete adhesion of the weight have resulted in some difficulties in maintaining the weight in the proper position.

Therefore, it is the general object of the invention to avoid and overcome the foregoing and other difficulties of and objections to the prior art practices by the provisions of a resiliently mounted wheel balancing weight which generally consists of an elongated strip of moldable lead having a layer of resilient material adhesively secured thereto with the resilient material adhesively secured to the radially inner surface of a wheel combination so that the lead is positioned to substantially counterbalance the unbalance in the wheel combination.

A further object of the invention is to provide a wheel balancing weight which utilizes a compressible plastic or rubber foam layer secured to the weight between the weight and the surface to which the weight is secured so as to resiliently mount the weight thereby substantially reducing shocks to the weight caused by wheel vibration.

A further object of the invention is to provide a simplified wheel balance weight which utilizes a soft resiliently deformable material which is water resistant on one side of the weight to which an adhesive coating is applied so that the adhesive coating may readily engage all irregular surfaces on that surface of the wheel to which the weight is applied because of the deformability of the deformable material.

Another object of the invention is to provide a balancing weight which is spread out rather than concentrated so that the weight may be readily and positively adhered into position by pressure sensitive adhesive means.

A further object of the invention is to provide a relatively elongate, thin wheel balancing weight that can be manually molded or shaped to circumferentially conform to and fit on a given wheel or rim surface to more uniformly counterbalance a spread area of unbalance in the wheel combination and which utilizes a deformable material between the weight and the wheel surface.

According to one embodiment of the invention, the balance weight or weights are adhered to the inner surface of the rim of the wheel of an automobile or other vehicle by a pressure sensitive adhesive. The rim is adapted to receive a pneumatic tire or may have such a tire mounted upon it. The rim may or may not be a component part of the wheel. The weight is not applied at the flange of the rim where a clip weight is necessarily attached, but on a radially inner surface of the rim where centrifugal force maintains the weight in contact with the rim and never loosens it. The weight may be between about ¼ and 1 inch wide, and about ¹⁄₁₆ to ½ inch thick, of substantially uniform cross-section and having a weight to surface area ratio so that the pressure-sensitive adhesive in combination with the centrifugal force will hold the weight in position.

A deformable resilient layer, normally made from plastic foam or foam rubber, is adhesively secured to one flat surface formed on the weight with the other side of the resilient layer then being adhesively secured to the rim. The thickness of the resilient layer may be very nearly the same as the weight, or may be considerably thinner dependent upon the amount of resiliency, and the condition of the surface to which it will be adhered. The resilient layer may be made from a vinyl closed cell foam which is essentially water repellent. The weight will usually be at least 5 times as long as it is wide, and may conveniently be sold in straight strips of about 12 to 18 inches long. If coiled it may be marketed as a much longer strip.

The weight or weights are sufficiently plastic so that they can be shipped as straight strips or in a coil, and then bent manually to the shape required to fit the rim in question. The use of the resilient layer allows the weight to be easily positioned over irregular surfaces, rivet heads, or the like. The weights are usually made of lead or lead composition. They may be rectangular in cross-section with the resilient deformable layer and adhesive on one of the two wider faces. The corners of the flat surface to which the resilient layer is attached are preferably beveled. Alternately, the attaching surface may be rounded or of any desired shape in order to adhere to a particular radially inner surface of the rim. The pressure sensitive adhesive layer may be covered with a release paper, transparent film or other strippable cover for protection, as is customary. Each weight in strip form is preferably marked or partially severed at equally spaced intervals representing certain increments of weight, so that one, two, or more such sections can easily be sheared or otherwise separated from the strip, as required to effect a balancing action.

For a better understanding of the invention, reference should be had to the accompanying drawings wherein.

Figure 1:
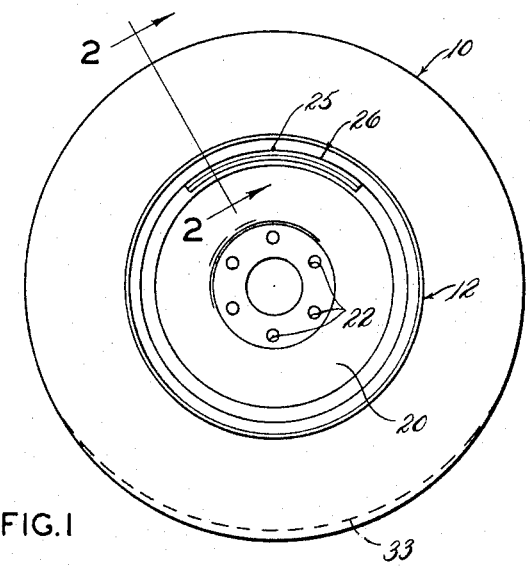
FIGURE 1 is a side elevation illustrating a tire, rim, wheel, and weight assembly in combination incorporating the principles of the invention.

In the drawings, the numeral 10 indicates generally a pneumatic tire, for example, of the endless bead, straight-sided type and mounted upon a drop center rim indicated as a whole by the numeral 12. The rim 12 is normally made in a single endless piece having a central well portion 14, substantially horizontal directed bead receiving flanges 16 extending laterally from the well 14 and integral therewith, the flanges 16 terminating in bead retaining flanges 18, extending substantially vertically, i.e. radially, and being formed integrally with the bead receiving flanges 16. The drop center rim 12 is normally attached, as by welding at 19, or suitable riveting, to a stamped metal wheel 20 having bolt receiving holes 22 by which the wheel 20 is mounted upon a wheel hub (not shown).

In order to balance the assembly of the tire 10, rim 12, and wheel 20, a weight or weights indicated as a whole by the numeral 26 are secured to a radially inner surface of the tire bead receiving flange 16, usually on the outboard side of the wheel 20. In order to completely hide the weight means from sight, they might be positioned on the inboard bead receiving flange 16, such as indicated by the dotted lines 26a in FIGURE 2. Also, in some instances the weight could be positioned on the bottom of the well 14, as indicated by the dotted lines 26b in FIGURE 2. Normally the position of the weight means on any specific lateral portion of the drop center rim 12 is determined by the position of the heavy portion of the tire 10. If for example, with reference to FIGURE 2 the heavy portion of the tire 10 is at the center as indicated by the dotted line portion 30, the proper position for a static and dynamic balance would be at the center of the well 14 as indicated by the weight 26b. Conversely, if the heavy area is as indicated by the dotted line 31 counterbalancing must take place as indicated by the solid weight 26. Similarly, if the heavy portion is as indicated by the dotted line 32 the counterbalancing must take place as indicated by the dotted weight 26a. Of course, it must be understood that the counterbalancing with the weights will be on the diametrically opposite side of the wheel combination from the heavy spots in the tire.

It should be noted that the weight 26 is extended over a substantial arcuate portion of the wheel combination and may be taken in FIGURE 1 to properly counterbalance an extended arcuate heavy portion in the tire as indicated by the dotted line 33. It is a well known fact that in molding tires, any slippage in the mold, or lap slices always extend over a substantial arcuate area of the tire so that any heavy portions creating unbalance will likewise extend over a substantial arcuate portion as indicated by the dotted line 33. Thus, it is one of the contentions of the invention that the elongated counterbalancing weight 26 achieves a better counterbalance of the extended arcuate heavy portion of the tire indicated by dotted line 33. It should be understood that the elongated weight 26 will be heavier than a counterbalance weight concentrated at the center thereof, or at a point 25, on the rim 12 since in effect the center of gravity of the weight 26 is radially inwardly from the point 25.

Figure 2:
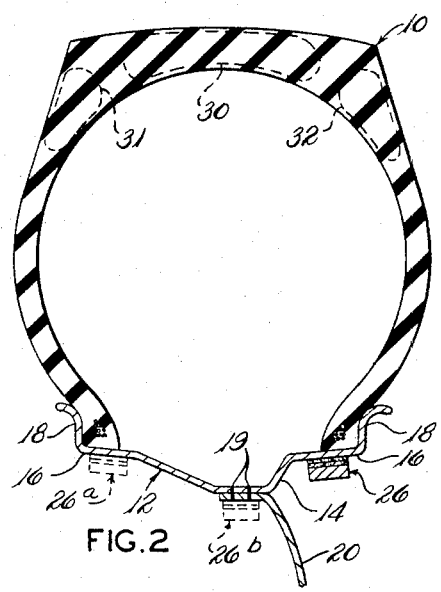
FIGURE 2 is a fragmentary enlarged radial cross-sectional view of the combination taken substantially on line 2—2 of FIGURE 1.
Figure 3:
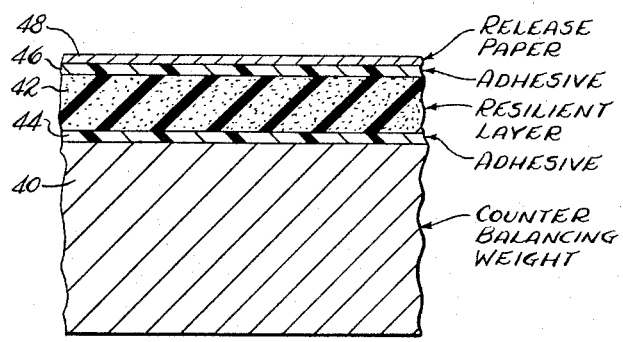
FIGURE 3 is an enlarged fragmentary cross-sectional view of the weight of the invention more specifically showing the composition thereof.

FIGURE 3 illustrates an enlarged fragmentary cross sectional view of the weight 26 of FIGURES 1 and 2. Essentially the weight 26 comprises a strip of lead composition 40 which is extruded or otherwise formed in a substantially uniform cross sectional area which might be circular, but generally having its width greater than its thickness. In other words, the invention contemplates that the strip 40 may be between, for example, about 1/4 and 1 inch in width and about 1/16 and 1/2 inch in thickness. A layer of deformable resilient material 42, such as foam rubber or plastic foam, preferably of a closed cell, water repellent type, is adhesively secured, preferably with pressure sensitive adhesive to one flat side of the strip 40 by an adhesive layer 44 which layer 44 bonds securely to the material 42 and the strip 40. In order to secure the weight to a desired radially inner surface of a rim, the other surface of the resilient layer 42 is also provided with an adhesive coating 46, again preferably a pressure sensitive adhesive, with a protective release paper 48 protecting the adhesive layer 46. Preferably, the invention contemplates that in order for the pressure sensitive adhesive layers 44 and 46 to securely adhere the counterbalancing weight strip 40 in position the strip 40 should be made from a lead sheet having a weight of between about .20 oz. per lineal in. to about 1.32 oz. per lineal in., and preferably about .88 oz. per lineal in. for automobile wheels. The thickness of the resilient layer 42 may vary between about 1/8 to about 1 times the thickness of the strip 40 with the optimum thickness being about 1/5 the thickness of strip 40, but should be thick enough to allow proper adhesion of the pressure sensitive layer 46 to the rim surface, over all irregularities and depressions, and to provide a resilient mounting for the weight strip 40. But preferably the layer 42 should have a minimum thickness of not less than about 1/32 inch to properly achieve the desired resilient mounting characteristics.

The invention contemplates that the strip 40 may be shaped by finger pressure to any contour. Further, the top corners of the strip away from the resilient layer and pressure sensitive adhesive layers might be beveled so that the strip can fit against a curved or angled surface. It is also possible that the strip 40 might be wider than the resilient layer 42 and the pressure sensitive adhesive layers 44 and 46 so that the adhesive layers 44 and 46 may spread with a spreading of the resilient layer 42 when the weight is pressed against a particular surface of the rim for adhesion thereto. This relationship is particularly shown in FIGURE 6.

Figure 4:
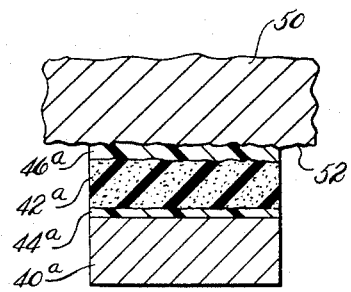
FIGURE 4 is an enlarged fragmentary cross sectional view of a weight employing the principles of the invention adhered to an irregular metallic surface.
Figure 5:
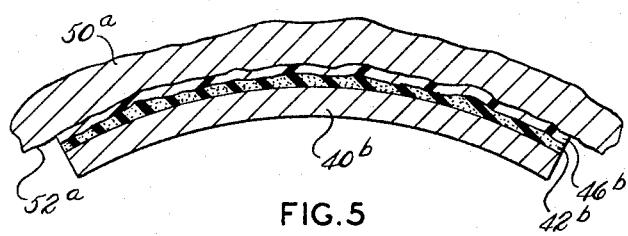
FIGURE 5 is an enlarged fragmentary cross sectional view of the weight of the invention shown in length adhered to an irregular metallic surface.
Figure 6:
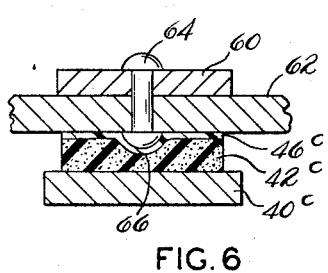
FIGURE 6 is an enlarged fragmentary cross sectional view of the weight of the invention adhered over a protruding rivet head.

FIGURES 4 through 6 illustrate adaptations made possible because of the resilient layer 42 in this particular weight combination. For example, FIGURE 4 illustrates the weight being attached to a member 50 having a flat but irregular surface 52. Utilization of a resilient layer 42a with a weight strip 40a and pressure sensitive adhesive layers 44a and 46a allows one upon applying the weight to push the strip 40a towards the surface 50 thereby compressing the resilient layer 42a which in turn allows the pressure sensitive adhesive layer 46a to much more easily press into every nook and cranny of the irregular surface 50. It has been proven that utilization of the resilient layer 42a allows a much better adhesive application to an irregular surface because of the compressive or deformable qualities of the resilient layer 42a. Of course, once the weight is in the proper position, the layer 42a then acts to provide a resilient mounting for the weight 40a. It has been shown in use that the resilient mounting eliminates sharp shocks to the adhesive layers 46a and 44a eliminating the possible breakdown and rupture thereof.

FIGURE 5 illustrates a side view in vertical cross section of the weight in length applied to a substantially arcuate member 50a which has an extremely irregular bottom surface 52a. Again, a weight strip 40b is secured to a resilient layer 42b which in turn is secured by a pressure sensitive adhesive coating 46b to the irregular surface 52a of the member 50a. In this instance the irregularities are probably exaggerated, yet it can easily be seen that the compressible or deformable feature of the layer 42b allows a complete adherence of the adhesive layer 46b to the surface 52a, thus insuring that the strip 40b will be firmly and positively mounted. Again, the resilient layer 42b allows resilient mounting of the weight 40b after it is adhesively secured into position.

FIGURE 6 illustrates members 60 and 62 operatively affixed together by a rivet 64, where the optimum position for counterbalancing with a weight was over the bottom head of the rivet 64. In this instance, a weight strip 40c is secured to a resilient layer 42c which in turn is secured to a pressure sensitive adhesive layer 46c. It should be noted how the resilient layer 42c has compressed in the area 66 over the top of the rivet head 64 whereas the remainder of the layer 42c is of its normal shape. Again, this provides a complete adherence of the pressure sensitive adhesive layer 46c to all surfaces of the member 62 and the head of the rivet 64. In this manner, a completely secure adhesive mounting of the strip 40c is provided. As in the situations of FIGURES 4 and 5, the strip 40c is also mounted resiliently to eliminate excessive jars onto the adhesive layer 46c caused by operation of the vehicle.

Because of the flexibility and/or manual shaping characteristics of the weight of the invention, it means that its positioning at any location is extremely simple. If the weight is circular in cross section it can be adhered to a circularly shaped surface. Also, because positioning is not a problem, the weight can be positioned at any lateral point substantially between the wheel bearings to compensate for any off center out of balance in the wheel combination thereby eliminating any dynamic out of balance such as is caused by conventional balancing weights clipped to the axially outer surface of the rim. Further, many times in balancing with conventional balancing weights, the weights must be split with one or more weights placed on the outer rim flange and one or more on the inner rim flange to stabilize the dynamic balance of the assembly. With this invention however double positioning of weight is eliminated because the weight may be positioned near or between the wheel bearings to at least substantially eliminate any dynamic out of balance condition.

Tests conducted with an extended arc balancing weight utilizing the resilient layer set forth in the invention have proved to have a considerable improvement over the conventional balancing weights, and even over the balancing weights of my above-identified application, mainly because of the resilient mounting allowing complete adherence of the adhesive coating to the receiving rim surface, and the elimination of shock to such an adhesive coating after the weight is in position. Of course, the improved balancing result with the weight is because of its extended length to more uniformly counterbalance an extended heavy area of unbalance in a wheel combination, and its ability to be positioned at any lateral position on a radially inner surface of the rim to compensate, with a single weight, for all dynamic out of balance conditions. As shown in FIGURE 1, it is believed that the spread length of the weight 26 to counterbalance the spread area of heavy unbalance 33 in the tire is a novel feature, which leads to the improved balancing.

While in accordance with the patent statutes at least one best known form of the invention has been illustrated and described in detail, it is to be particularly understood that the invention is not to be limited thereby, but that the inventive scope is to be defined in the appended claims.

What is claimed is:
1. In a balancing weight for an out-of-balance pneumatic tire and wheel the combination of
   a metal strip moldable by finger pressure having a weight of between .2 ounce per lineal inch to .88 ounce per lineal inch with a width between substantially two and five times the thickness and a length greater than five times the width, adapted to be positioned on a determined lateral position on a radially inward surface of the wheel to uniformly counterbalance statically and dynamically the out-of-balance pneumatic tire and wheel,
   a deformable resilient layer of water repellent closed cell foam of substantially the same length and width, but less than the thickness of the strip, and more than ⅕ the thickness thereof adhesively secured to the strip and adapted to be positioned between the strip and the radially inward surface of the wheel, and
   adhesive means to secure said resilient layer to said radially inward surface of said wheel.

2. In combination,
   a wheel having a rim with an axially extending flange,
   a pneumatic tire mounted on the rim and retained by the flange, said tire having an extended arcuate heavy area of gradually distributed unbalance,
   a metal strip moldable by finger pressure positioned upon an arcuate radially inward surface of the rim, said strip having an arcuate length substantially equal to the arcuate length of the extended arcuate heavy area of gradually distributed unbalance in the tire, said strip having a weight per lineal inch of between substantially .2 to .88 ounce and having a width between 2 and 5 times the thickness and a length greater than 5 times the width and being positioned on the radially inward surface of the rim to uniformly counterbalance the extended arcuate heavy area of gradually distributed unbalance in the tire, and
   resilient means adhesively secured to said strip and to said rim to hold said strip in position upon said radially inward surface of the rim when the strip is manually forced into position by forcing the resilient means together with the adhesive against said surface.

3. A combination according to claim 2 where the resilient means is a strip of water repellent closed cell foam having a thickness of between substantially ⅛ to substantially 1 times the thickness of the metal strip to provide sufficient resilience to eliminate shock to the adhesive securing said strip to said rim.

4. A combination according to claim 2 where the resilient means is a strip of water repellent closed cell foam having a thickness of between substantially ¼ to substantially 1 times the thickness of the metal strip to provide sufficient resilience to eliminate shock to the adhesive securing said strip to said rim.

5. In combination,
   a wheel having a rim with an axially extending flange,
   a pneumatic tire mounted on the rim and retained by the flange, said tire having an extended arcuate heavy area of gradually distributed unbalance,
   a metal strip moldable by finger pressure positioned on a radially inward surface of the rim to uniformly counterbalance statically and dynamically the extended arcuate heavy area of the tire, said metal strip being heavier than the amount of weight necessary to counterbalance the tire if it were concentrated at a point on the rim at the center of the metal strip,
   a deformable resilient water repellent layer of substantially the same length and width as the metal strip positioned between the strip and the rim, said layer being at least ¹⁄₃₂ inch in thickness, and
   pressure sensitive adhesive means to secure said strip to said resilient layer, and said resilient layer to said surface of the rim, whereby the deformable resilient layer eliminates shock to the adhesive means during wheel operation by providing a floating mounting of the strip to the rim.

6. A combination according to claim 5 where the resilient layer is a strip of water repellent closed cell foam.

7. In a balancing weight for a pneumatic tire and wheel having an extended arcuate heavy area of gradually distributed unbalance the combination of
   a metal strip moldable by finger pressure of between substantially .2 to .88 oz. per lineal inch adapted to be positioned on a radially inward surface of the wheel to uniformly counterbalance statically and dynamically the out of balance pneumatic tire and wheel, said strip being heavier than the amount of weight necessary to counterbalance the heavy area if it were concentrated at a point on the wheel at substantially the center of the strip,
   a deformable resilient layer of substantially the same length and width, but less than the thickness of the strip, but being at least ¹⁄₃₂ inch in thickness adhesively secured to the strip and adapted to be positioned between the strip and the radially inward surface of the wheel, and pressure sensitive adhesive means to secure said resilient layer to said radially inward surface of said wheel.

References Cited by the Examiner

UNITED STATES PATENTS

| | | | |
|---|---|---|---|
| 2,292,024 | 8/1942 | Dreher | 161—406 |
| 2,292,528 | 8/1942 | Kraft | 303—5 |
| 2,336,920 | 12/1943 | Beaman | 301—5 |
| 2,640,727 | 6/1953 | Kennedy | 301—5 |
| 3,154,347 | 10/1964 | Griffith | 301—5 |
| 3,177,039 | 4/1965 | Skidmore | 301—5 |

FOREIGN PATENTS 1,109,941  10/1955  France.

BENJAMIN HERSH, *Primary Examiner.*

A. HARRY LEVY, R. J. JOHNSON,
*Assistant Examiners.*